United States Patent
Zarkesh et al.

(10) Patent No.: US 10,686,234 B1
(45) Date of Patent: Jun. 16, 2020

(54) FLUORINATED IONIC LIQUIDS FOR BATTERY ELECTROLYTES

(71) Applicant: National Technology & Engineering Solutions of Sandia, LLC, Albuquerque, NM (US)

(72) Inventors: Ryan A. Zarkesh, Livermore, CA (US); Forrest S. Gittleson, Livermore, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 280 days.

(21) Appl. No.: 15/666,276

(22) Filed: Aug. 1, 2017

(51) Int. Cl.
*H01M 12/08* (2006.01)
*H01M 4/38* (2006.01)
*H01M 4/90* (2006.01)

(52) U.S. Cl.
CPC ............ *H01M 12/08* (2013.01); *H01M 4/90* (2013.01); *H01M 4/382* (2013.01); *H01M 2300/0045* (2013.01)

(58) Field of Classification Search
None
See application file for complete search history.

(56) References Cited

U.S. PATENT DOCUMENTS

| | | | | |
|---|---|---|---|---|
| 9,911,981 B1* | 3/2018 | Kane | ............. | H01M 4/8846 |
| 2012/0208096 A1* | 8/2012 | Kuboki | ............. | H01M 4/382 |
| | | | | 429/405 |
| 2019/0190104 A1* | 6/2019 | Barde | ............. | H01M 12/08 |

FOREIGN PATENT DOCUMENTS

GB 1269095 A * 3/1972 .......... C07D 213/20

OTHER PUBLICATIONS

Burrell, et al., "The Large Scale Synthesis of Pure Imidazolium and Pyrrolidinium Ionic Liquids", In Green Chemistry, vol. 9.5, Feb. 16, 2007, pp. 449-454.
Le, et al., "Electrolyte Based on Fluorinated Cyclic Quaternary Ammonium Ionic Liquids", In Ionics, vol. 18, 2012, pp. 817-827.
Liu, et al., "Solubility of Gases in a Common Ionic Liquid from Molecular Dynamics Based Free Energy Calculations", In Journal of Physical Chemistry B, vol. 118, No. 10, 2014, pp. 2719-2725.
Miao, et al., "Solution Viscosity Effects on the Heterogeneous Electron Transfer Kinetics of Ferrocenemethanol in Dimethyl Sulfoxide-Water Mixtures", In Journal of Physical Chemistry B, American Chemical Society, vol. 106, No. 6, Jan. 15, 2002, pp. 1392-1398.
Pereiro, et al., "Fluorinated Ionic Liquids: Properties and Applications", In ACS Sustainable Chemistry and Engineering, American Chemical Society, 2013, pp. 427-439.

(Continued)

*Primary Examiner* — Robert S Carrico
(74) *Attorney, Agent, or Firm* — Madelynne J. Farber; Samantha Updegraff

(57) ABSTRACT

An ionic liquid comprising a cationic chemical species and an anionic chemical species. The cationic chemical species comprising a nitrogen containing moiety and a partially fluorinated alkyl chain moiety, wherein the partially fluorinated alkyl chain moiety is bonded to a nitrogen atom of the nitrogen containing moiety. The ionic liquid can be used as an electrolyte, as an additive to an organic solvent, as a lubricant, as a hydrophobic coating, as a treatment for fluorinated pollutants, as an electrolyte for sensor applications, as a stabilizing additive for existing battery electrolytes, and as an emulsifier.

7 Claims, 13 Drawing Sheets

(56) References Cited

OTHER PUBLICATIONS

Tran, et al., "Synthesis of New Fluorinated Imidazolium Ionic Liquids and Their Prospective Function as the Electrolytes for Lithium-Ion Batteries", In Journal of Fluorine Chemistry, vol. 164, 2014, pp. 38-43.
Xue, et al., "Ionic Liquids With Fluorine-Containing Cations", In European Journal of Inorganic Chemistry, Microreview, 2005, pp. 2573-2580.
Zhang, et al., "Physical properties of ionic liquids: Database and evaluation", In Journal of Physical and Chemical Reference Data, vol. 35, 2006, pp. 1475-1517.

* cited by examiner

US 10,686,234 B1

FLUORINATED IONIC LIQUIDS FOR BATTERY ELECTROLYTES

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

FIELD

This disclosure relates to ionic liquids that can be used as electrolyte components in non-aqueous energy storage devices.

BACKGROUND

Most energy storage systems exhibit limited capacities despite their use of high energy and low atomic weight materials (e.g. lithium, sodium, magnesium or zinc anode). Batteries with these types of metallic anodes could drastically impact applications that demand a rugged, safety-focused, low weight, small volume, or high energy-density power source. For example, metal-air batteries show great promise as an automobile power source.

Metal-air batteries are batteries which use an anode made from a metal and an external cathode of ambient air (e.g., oxygen) along with an electrolyte and a separator. Importantly, there is a direct relationship between the oxygen solubility in the electrolyte and energy density of a metal-air battery. Despite recent progress in developing metal-air batteries, challenges remain. One such challenge is the choice of a suitable electrolyte. An electrolyte used in a metal-air battery should meet the requirements for reactant (e.g., oxygen) solubility and diffusivity, ionic conductivity, thermal and electrochemically stability and compatibility with electrode materials. Currently, fast transport of the reactant, oxygen, through the electrolyte is a primary obstacle to achieving high performance in metal-air batteries.

Several different types of electrolytes can be used as the electrolyte in a metal-air battery, such as aqueous electrolytes, organic electrolytes, solid-state electrolytes, and ionic liquids. Ionic liquids are useful as an electrolyte component in lithium, sodium, magnesium, and zinc batteries as they are non-volatile, non-flammable, have a low melting point, and have high ionic conductivity.

SUMMARY

In an embodiment disclosed herein, an ionic liquid comprises a cationic chemical species and an anionic chemical species. The cationic chemical species comprises a nitrogen containing moiety and a partially fluorinated alkyl chain moiety. The partially fluorinated alkyl chain moiety contains a first carbon atom bonded to a nitrogen atom of the nitrogen containing moiety and a second carbon atom bonded to the first carbon atom. Both the first and second carbon atoms are non-fluorinated (i.e., not bonded to fluorine atoms). The remaining carbon atoms in the alkyl chain moiety may be fluorinated. The length of the partially fluorinated alkyl chain moiety may be selectively varied in order to modify the solubility and/or diffusivity of reactants such as ions or oxygen, the hydrophobicity, or thermal or electrochemical stability. As used herein, an ionic liquid means a substance comprising dissociated ions, i.e. cations and anions. Ionic liquids can include substances that have a melting point of 100° C. or lessor molten salts at higher temperatures.

A process for making an ionic liquid includes mixing a partially fluorinated alkyl chain containing a terminal hydroxyl group, a phosphorous trihalide, and an organic solvent to form a partially fluorinated alkyl halide. The partially fluorinated alkyl halide is mixed with a secondary or tertiary amine and an organic solvent to form an intermediate ionic liquid. The intermediate ionic liquid is then mixed with a salt to form the ionic liquid.

A metal-air battery includes a porous cathode collector with an air interface, an electrolyte comprising an ionic liquid and (optionally) an organic solvent; a metal anode, and a separator impregnated by the ionic liquid and bonded between the porous cathode current collector and the metal anode. The ionic liquid comprises a cationic chemical species and an anionic chemical species. The cationic chemical species comprises a nitrogen containing moiety and a partially fluorinated alkyl chain moiety. The partially fluorinated alkyl chain moiety contains a first carbon atom bonded to a nitrogen atom of the nitrogen containing moiety and a second carbon atom bonded to the first carbon atom. Both the first and second carbon atoms are non-fluorinated. The remaining carbon atoms in the partially fluorinated alkyl chain moiety may be fluorinated.

The above description presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later

DETAILED DESCRIPTION

Figure 1:
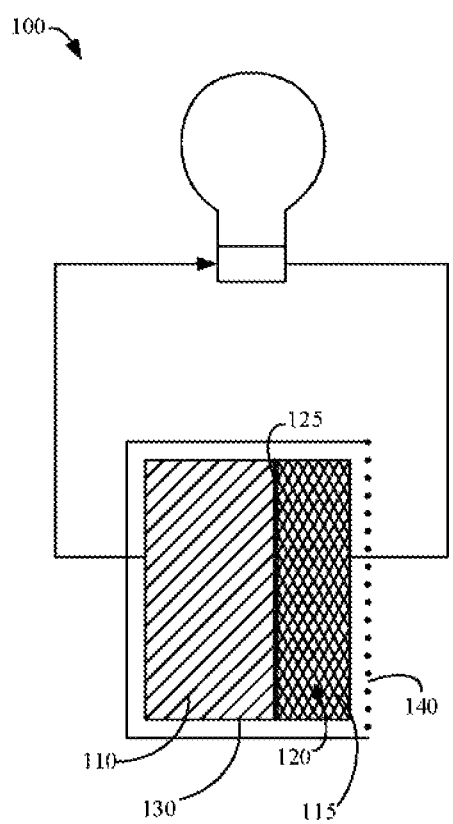
FIG. 1 is a schematic of an embodiment of a metal-air battery which uses an electrolyte comprising an ionic liquid.

Disclosed herein are methods for synthesizing an ionic liquid comprising a cationic chemical species and an anionic chemical species. The cationic chemical species comprises a nitrogen containing moiety and a partially fluorinated alkyl chain moiety, wherein the partially fluorinated alkyl chain moiety is bonded to a nitrogen atom of the nitrogen containing moiety. The length of the partially fluorinated alkyl chain moiety may be modified in order to positively or negatively affect the solubility/diffusivity of reactants such as ions or oxygen, the hydrophobicity, or thermal or electrochemical stability of the electrolyte.

The ionic liquid is a substance comprising dissociated ions. In an embodiment, the ionic liquid may, for example, have a melting point of 100° C. or less, such as, for example, a melting point of −100° C. to 30° C., or 0° C. to 25° C. In an embodiment, the ionic liquid may be a molten salt at temperatures above 100° C. In an embodiment, the ionic liquid is thermally stable (to decomposition) up to 350° C., such as thermally stable up to 300° C., or from 100° C. to 325° C., which indicates low flammability and low volatility. In an embodiment, the ionic liquid may have a viscosity that is optimized to be as low as possible to promote ionic conductivity. The dynamic (shear) viscosity can range from 10 to 200 cP, such as, for example, 20 to 100 cP, 45 to 75 cP, or 100 to 150 cP. In an embodiment, the ionic liquid has a conductivity of, for example, 0.1 to 1000 mS/cm, such as about 150 to 300 mS/cm or 400 to 700 mS/cm.

In an embodiment, an ionic liquid comprises a cationic chemical species and an anionic chemical species. The cationic chemical species comprises a nitrogen containing moiety and a partially fluorinated alkyl chain moiety bonded to a nitrogen atom of the nitrogen containing moiety. The partially fluorinated alkyl chain moiety contains at least two non-fluorinated (i.e., not bonded to fluorine atoms) carbon atoms: a first carbon atom bonded to the nitrogen atom of the nitrogen containing moiety and a second carbon atom bonded to the first carbon atom. The two non-fluorinated carbon atoms can stabilize the cationic chemical species, and as a result, the ionic liquid as a whole. The remaining carbon atoms in the partially fluorinated alkyl chain moiety may be fluorinated or not fluorinated. The partially fluorinated alkyl chain moiety may be straight, branched or cyclic; saturated or unsaturated; and aromatic or aliphatic. The number of carbon atoms in the partially fluorinated alkyl chain moiety may range from 3 to 26 carbon atoms. For example, the number of carbon atoms in the partially fluorinated alkyl chain moiety may range from 5 to 15 carbon atoms, from 7 to 14 carbon atoms, or from 17 to 22 carbon atoms. The number of fluorine atoms in the partially fluorinated alkyl chain moiety may range from 3 to 49 fluorine atoms. For example, the number of fluorine atoms in the partially fluorinated alkyl chain moiety may range from 10 to 35 fluorine atoms, 20 to 30 fluorine atoms, or 40 to 45 fluorine atoms. Accordingly, the ratio of carbon atoms to fluorine atoms in the partially fluorinated alkyl chain moiety may range from 1:1 to 0.53:1. For example, the ratio of carbon atoms to fluorine atoms may range from 0.8:1 to 0.6:1, from 0.71:1 to 0.66:1, or from 0.59:1 to 0.54:1.

The nitrogen containing moiety of the cationic chemical species can be a non-cyclic or cyclic amine. Suitable non-cyclic amine moieties that can be used as the nitrogen containing moiety include a tetraalkylamine, such as tetramethylamine, tetraethylamine, tetrabutylamine, butyl diethyl amine, or derivatives thereof. Suitable cyclic amines that can be used as the nitrogen containing moiety include azole rings, such as thiazole, imidazole, isothiazole, pyrazole, and derivatives thereof, bicyclic rings such as indoline, quinoline, and derivatives thereof, non-aromatic heterocyclics such as pyrrolidine, piperidine, azocane, piperazine, morpholine, thiomorpholine, and derivatives thereof, and aromatic heterocyclic rings, such as pyridine and derivatives thereof.

The partially fluorinated alkyl chain moiety is bonded to a nitrogen atom of the nitrogen containing moiety so as to impart a positive charge to the cation. An alkyl chain or a functionalized alkyl chain may also be bonded to the nitrogen atom of the nitrogen containing moiety.

The anionic chemical species may be selected from the group comprising tetrafluoroborate ($BF_4^-$), tetrachloroaluminate ($AlCl_4^-$), trifluoromethanesulfonate ($CF_3SO_3^-$), bis (trifluoromethanesulfonyl)imide (($CF_3SO_2)_2N^-$) (TFSI), bis (oxalate)borate ($B(C_2O_4)_2^-$), bis(perfluoroethylsulfonyl) imide (($CF_3CF_2SO_2)_2N^-$), perchlorate ($ClO_4^-$), hexafluorophosphate ($PF_6^-$), sulfate, phosphate, chloride, bromide, iodide, and derivatives thereof. Potential useful anions that can be used along with the cationic chemical species are described in Zhang, S., Sun, N., He, X., Lu, X. & Zhang, X. Physical properties of ionic liquids: Database and evaluation. *J. Phys. Chem. Ref Data* 35, 1475-1517 (2006), which is herein incorporated by reference.

The length (i.e., the number of carbon atoms) of the partially fluorinated alkyl chain moiety may be varied in order to adjust the solubility/diffusivity of a gas, such as oxygen or carbon dioxide, or other solute, such as lithium or sodium ions, in the ionic liquid. Longer partially fluorinated alkyl chain moieties generally correspond to lower gas solubility, but higher gas diffusivity. Shorter partially fluorinated alkyl chain moieties generally correspond to higher gas solubility, but lower gas diffusivity. For example, oxygen solubility may range from 1 to 25 mM, such as 2 to 20 mM, or 5 to 15 mM from exposure to 1 atm air. This will be partially dependent on the concentration of oxygen in the air, but for purposes of defining this range 20.95% by volume oxygen will be used, as measured at standard temperature and pressure. Additionally, the length of the partially fluorinated alkyl chain moiety affects the viscosity of the ionic liquid. Generally, at least for the compounds disclosed in the Examples section, the longer partially fluorinated alkyl chain moieties correspond to increased viscosity and shorter partially fluorinated alkyl chain moieties correspond to decreased viscosity.

The ionic liquid described herein can be used in many applications. In one example, the ionic liquid may be used as an electrolyte component (e.g., solvent, salt or additive) in a metal-air battery. The ionic liquid can also be used as an additive dissolved into organic solvents, even when organics solvents are not liquid at temperatures less than 100° C. Additionally, the ionic liquid may have applications in lubricants, hydrophobic coatings, remediation of fluorinated pollutants, electrolytes for sensor applications, stabilizing additives to existing battery electrolytes, and emulsifiers.

In an exemplary method for synthesizing the ionic liquid, a partially fluorinated alkyl halide is first synthesized by mixing a partially fluorinated alkyl chain terminated in a terminal hydroxyl group, a phosphorous trihalide or a phosphorous pentahalide, and an organic solvent. Shortly after (0.05 to 3 hours) the partially fluorinated alkyl halide is synthesized, an intermediate ionic liquid is then synthesized by mixing a secondary or tertiary amine, the partially fluorinated alkyl halide, and an organic solvent. The final product ionic liquid described above is then synthesized by mixing the intermediate ionic liquid, a salt, and water.

The partially fluorinated alkyl halide is synthesized by mixing a partially fluorinated alkyl chain containing a terminal hydroxyl group (available commercially), a phosphorous halide, such as phosphorous trihalide or a phosphorous pentahalide, and after the reaction has proceeded to completion and/or quenched, an organic solvent is used to recover the product. The terminal hydroxyl group is bonded to a first carbon atom of the partially fluorinated alkyl chain. The first carbon atom of the partially fluorinated alkyl chain is bonded to a second carbon atom of the partially fluorinated alkyl chain. Both the first carbon atom and the second carbon atom are non-fluorinated. The remaining carbon atoms in the partially fluorinated alkyl chain may be fluorinated. Without being bound by theory, it is believed that the two non-fluorinated carbon atoms help the reaction proceed. Thus, the total amount of carbon atoms in the partially fluorinated alkyl chain may range from 3 to 26. For example, the amount of carbon atoms in the partially fluorinated alkyl chain may range from 4 to 15, from 7 to 14, or from 18 to 21. The total amount of fluorine atoms in the partially fluorinated alkyl chain may range from 3 to 49. For example, the total amount of fluorine atoms in the partially fluorinated alkyl chain may range from 4 to 25, from 10 to 20, or from 30 to 25. Accordingly, the ratio of carbon atoms to fluorine atoms in the partially fluorinated alkyl chain may range from 1:1 to 0.53:1. For example, the ratio of carbon atoms to fluorine atoms may range from 0.8:1 to 0.6:1, from 0.71:1 to 0.66:1, or from 0.59:1 to 0.54:1.

The phosphorous trihalide may be selected from the group consisting of $PCl_3$, $PBr_3$, $PI_3$, and combinations thereof. The phosphorous pentahalide may be selected from the group comprising $PCl_5$, $PBr_5$, and combinations thereof.

The organic solvent may be a polar, non-polar, or aprotic solvent that is capable of aiding in the recovery of the partially fluorinated alkyl halide. For example, the organic solvent is selected from the group comprising dichloromethane, acetonitrile, diethyl ether, tetrahydrofuran, toluene, benzene, dimethoxy ethane, carbon disulfide, acetone, or dimethyl sulfoxide.

In an embodiment, the partially fluorinated alkyl halide is synthesized by mixing 1 to 3 parts by volume of the partially fluorinated alkyl chain containing a terminal hydroxyl group, 1 to 3 parts by volume of the phosphorous trihalide, and 1 to 10 parts by volume of the organic solvent. For example, 1 to 3 parts by volume, 1.2 to 2.9 parts by volume, or 1.5 to 2 parts by volume of the partially fluorinated alkyl halide containing a terminal hydroxyl group may be used. The phosphorous trihalide, for example, can be added in an amount of 1.2 to 2.9 parts by volume, 1.5 to 2.5 parts by volume, or 2 to 2.5 parts by volume. The organic solvent can be added in an amount of 2 to 9 parts by volume, 3 to 7 parts by volume, or 4 to 5 parts by volume. These reactants are then mixed for sufficient time for the reaction to go to completion, such as 30 to 90 minutes at room temperature and about 1 atm. For example, the reactants may be mixed at room temperature for 35 to 85 minutes, 50 to 75 minutes, or 60 to 70 minutes. After mixing the reactants for the desired amount of time, unused reactants may be quenched by the addition of water or another quenching agent, followed by the addition of an effective amount of organic solvent to extract the products. For example, the organic solvent may be added in an amount of 2 to 6 parts by volume, 2.5 to 5 parts by volume, or 3 to 4 parts by volume.

While other methods of synthesizing a partially fluorinated alkyl halides exist, many of these methods require the use of hydrogen fluoride, a dangerous, corrosive chemical. The previously described method avoids the use of hydrogen fluoride and provides a relatively safe method to synthesize a partially fluorinated alkyl halide that can be used as a precursor to an ionic liquid.

In an embodiment, subsequent to the synthesis of the partially fluorinated alkyl halide, an intermediate ionic liquid is synthesized by mixing a secondary or tertiary amine, the partially fluorinated alkyl halide formed from the previous reaction, and an organic solvent. For example, the secondary or tertiary amine may be an amine bonded to alkyl chains, such as trimethylamine, triethylamine, tributylamine, butyl diethyl amine, and derivatives thereof, an azole, such as pyrazole, thiazole, isothiazole, imidazole, and derivatives thereof, a bicyclic heteroaromatic such as indoline, quinoline, isoquinoline, and derivatives thereof, a heteroaromatic such as pyridine and derivatives thereof, or a non-aromatic heterocyclic, such as pyrrolidine, piperidine, azocane, piperazine, morpholine, thiomorpholine, and derivatives thereof. The organic solvent may be a polar, non-polar, or aprotic solvent, and, for example, may be selected from the group comprising toluene, dichloromethane, acetonitrile, diethyl ether, tetrahydrofuran, toluene, benzene, dimethoxy ethane, carbon disulfide, acetone, or dimethyl sulfoxide.

In an embodiment, the intermediate ionic liquid is synthesized by mixing 1 to 2 parts by volume of the partially fluorinated alkyl halide, 1 to 3 parts by volume of a secondary or tertiary amine, and 1 to 10 parts by volume of an organic solvent. For example, the amount of partially fluorinated alkyl halide may range from 1.1 to 1.9 parts by volume, from 1.2 to 1.8 parts by volume, or from 1.4 to 1.6 parts by volume. For example, the amount of secondary or tertiary amine may range from 1.2 to 2.8 parts by volume, from 1.5 to 2.5 parts by volume, or from 2 to 2.2 parts by volume. The amount of organic solvent may range from 2 to 9 parts by volume, from 3 to 8.5 parts by volume, or from 4 to 6 parts by volume.

In certain embodiments, for example, embodiments using a tertiary amine, the reactants may be heated at a temperature ranging from 50 to 120° C. in order to drive the substitution reaction of a tertiary amine to generate a quaternary ammonium salt. For example, the reactants may be heated in a temperature ranging from 85 to 95° C., from 90 to 105° C., or from 100 to 115° C. In embodiments where a secondary amine is used, $K_2CO_3$ may be used to sequester the formation of HBr.

In an embodiment, in the presence of air, the partially fluorinated alkyl halide may begin to revert back to a partially fluorinated alkyl chain containing a terminal hydroxyl group and phosphorous trihalide in as little as six to eight hours. Thus, in order to ensure high yields of ionic liquid, the intermediate ionic liquid may be synthesized within 3 hours after synthesis of the partially fluorinated alkyl halide. For example, synthesis of the intermediate ionic liquid may occur within 0.25 to 1 hours, 0.5 to 1.25 hours, or 1 to 2.5 hours after synthesis of the partially fluorinated alkyl halide.

In an embodiment, the intermediate ionic liquid is converted into an ionic liquid via a metathesis reaction which replaces the halide anion of the intermediate ionic liquid with an anionic chemical species. The intermediate ionic liquid is dissolved in water and treated with activated carbon at a temperature ranging from 35 to 75° C. in order to remove impurities. For example, the temperature may range from 40 to 60° C., 50 to 65° C., or 55 to 70° C. The activated carbon is then removed via filtration and the intermediate ionic liquid is mixed with a salt dissolved in distilled water. The salt may be selected from the group comprising lithium bis(trifluoromethanesulfonyl)imide (LiTFSI), calcium bis(trifluoromethanesulfonyl)imide, sodium bis(trifluoromethanesulfonyl)imide, lithium tetrafluoroborate, calcium tetrafluoroborate, sodium tetrafluoroborate, lithium trifluoromethanesulfonate, calcium trifluoromethanesulfonate, sodium trifluoromethanesulfonate, lithium perchlorate, calcium perchlorate, sodium perchlorate, lithium hexafluorophosphate, calcium hexafluorophosphate, sodium hexafluorophosphate, lithium sulfate, calcium sulfate, sodium sulfate, lithium bis(oxalate)borate, calcium bis(oxalate)borate, sodium bis(oxalate)borate, lithium tetrachloroaluminate, calcium tetrachloroaluminate, sodium tetrachloroaluminate, lithium bis(perfluoroethylsulfonyl)imide, calcium bis(perfluoroethylsulfonyl)imide, or sodium bis (perfluoroethylsulfonyl)imide.

The salt may be added in a ratio ranging from 1 to 10 parts by weight to parts by weight of the intermediate ionic liquid. For example, the salt may be added in a ratio to the intermediate ionic liquid ranging from 1.5 to 9.5 parts by weight, from 3 to 7 parts by weight, or from 4.5 to 6.5 parts by weight. Mixing the salt with the intermediate ionic liquid results in the formation of the final product ionic liquid described above. The final product ionic liquid may be extracted using dichloromethane.

In certain embodiments, the ionic liquid may be purified by crystallization from ethanol 2 to 6 times. For example, the ionic liquid may be crystallized 1 to 3 times, 2 to 4 times, or 3 to 5 times. In other embodiments, the ionic liquid may be sufficiently hydrophobic that it can be separated from water by decanting.

The ionic liquid is further purified by pouring off any water and being treated with more activated carbon until the ionic liquid is clear and colorless as determined by UV-spectroscopy. The ionic liquid is then filtered to remove the activated carbon and dried under vacuum. The ionic liquid is then ready to be used in a variety of applications, such as in a metal-air battery.

FIG. 1 shows a schematic of an embodiment of a metal-air battery 100, which includes a metal anode 110, a porous cathode current collector 115 with an air interface 140, and a separator 125 that is soaked in an electrolyte comprising an ionic liquid 120. These components are all contained within a housing 130. Charged species, such as Li$^+$ ions, flow through the ionic liquid 120 between the metal anode 110 and porous cathode current collector 115. The separator 125 is bonded between (in this case in direct contact with) the porous cathode current collector 115 and the metal anode 110, and is in contact with and is wetted by the electrolyte 120. The separator 125 is in the path of ion flow between the anode 110 from the porous cathode current collector 115.

The porous cathode current collector 115 is bonded to the air interface 140 that exposes the porous cathode current collector 115 to ambient air, but still contains the battery components within the housing 130. The porous cathode current collector 115 should be conductive and capable of transporting charge.

In an embodiment, the cathode current collector comprises a porous nanostructured or microstructured material that has pores that are controllable in size (diameter) and dispersity. The porous material should also be conductive. The average pore size, measured from one side of the pore to another, may range from 10 nm to 10 µm, such as, for example, 25 nm to 200 nm, or 50 nm to 5 µm. This average may be calculated as a number average deduced from measurements on a microscopic image. The pore polydispersity in terms of pore diameters, may range from, for example, 1 to 1.5, 1.01 to 1.1, 1.0 to 1.3. This may also be calculated as a number average deduced from measurements on a microscopic image.

In an embodiment, the cathode current collector includes conductive particles that are embedded within the structure of the porous cathode current collector. These particles may be selected, for example, from carbon black, carbon nanoparticles, gold, platinum, or nanotubes. The amount of conductive nanomaterials added to the porous cathode current collector will be sufficient to meet a percolation threshold, at which a complete electrical network is formed throughout the porous cathode current collector to carry electrons in and out of the metal-air battery.

In an embodiment, the pores of the porous cathode current collector are functionalized to catalytically enhance the reaction between metal ions and oxygen. In a specific embodiment, the pores are functionalized with gold, platinum, or other metal catalyst in order to substantially increase overall efficiency.

The metal anode may comprise a material that is subject to oxidation. Examples include lithium, calcium, aluminum, sodium, iron, cadmium, zinc, magnesium, and alloys of metals.

The electrolyte used in the metal-air battery comprises the ionic liquid described above as well as an organic solvent. Specifically, the electrolyte comprises an ionic liquid comprising a cationic chemical species and an anionic chemical species and optionally an organic solvent. In other embodiments, the electrolyte may solely comprise the ionic liquid. The cationic chemical species comprises a nitrogen containing moiety and a partially fluorinated alkyl chain moiety. The partially fluorinated alkyl chain moiety contains at least two non-fluorinated carbon atoms: a first carbon atom bonded to a nitrogen atom of the nitrogen containing moiety, and a second carbon atom bonded to the first carbon atom. The remaining carbon atoms in the partially fluorinated alkyl chain moiety may be non-fluorinated. The number of carbon atoms in the partially fluorinated alkyl chain moiety may range from 3 to 26 carbon atoms. For example, number of carbon atoms in the partially fluorinated alkyl chain moiety may range from 5 to 17 carbon atoms, from 7 to 16 carbon atoms, or from 15 to 18 carbon atoms. The organic solvent may be, for example, ethylene carbonate, dimethyl carbonate, propylene carbonate, dimethyl sulfoxide, dimethoxyether, diglyme, triglyme, tetraglyme, sulfones, and derivatives thereof.

In an embodiment, the use of the previously described ionic liquid in the metal-air battery provides low volatility, high ionic conductivity, high thermal stability, and a wide electrochemical window. As discussed above, the length of the partially fluorinated alkyl chain may be varied to modulate the solubility/diffusivity of the reactant gas.

The separator should be a porous membrane that allows charge carriers (in this case, metal ions) within the ionic liquid to pass, but prevents short circuits between the metal anode and the porous cathode current collector. The separator may be selected from those commonly used in metal-air batteries, such as, any of a variety of microporous polymeric, glass, or nonwoven fiber membranes that are chemically and electrically stable in the selected electrolyte.

A suitable ionic liquid and cathode current collector system can be formed along with an anode and separator into a housing, such as, for example, a coin cell configuration.

In an embodiment, the metal-air battery may include an oxygen gas source, and this oxygen gas source may be a pure oxygen gas source. For example, the metal-air battery may be supplied continuously with oxygen for the porous cathode current collector.

EXAMPLES

The following section describes a detailed example of the synthesis of four ionic liquids, two of which contain a cyclic nitrogen containing moiety and two of which contain a non-cyclic nitrogen containing moiety: N-methyl-N-3,3,4,4,5,5,6,6,6-nonafluorohexyl-pyrrolidinium bis(trifluoromethanesulfonyl)imide (abbreviated as $Pyr_{1,6F9}$-TFSI), 3,3,4,4,4-pentafluorobutyl-triethylammonium bis(trifluoromethanesulfonyl)imide (abbreviated as $N_{2,2,2,4F5}$-TFSI), 3,3,4,4,5,5,6,6,6-nonafluorohexyl-triethylammonium bromide (abbreviated as $N_{2.2.2.6F9}$-Br), and N-methyl-N-3,3,4,4,4-pentafluorobutyl-pyrrolidinium bis(trifluoromethanesulfonyl)imide (abbreviated as $Pyr_{1.4F5}$-TFSI). The chemical structure of the cations of the four ionic liquids were:

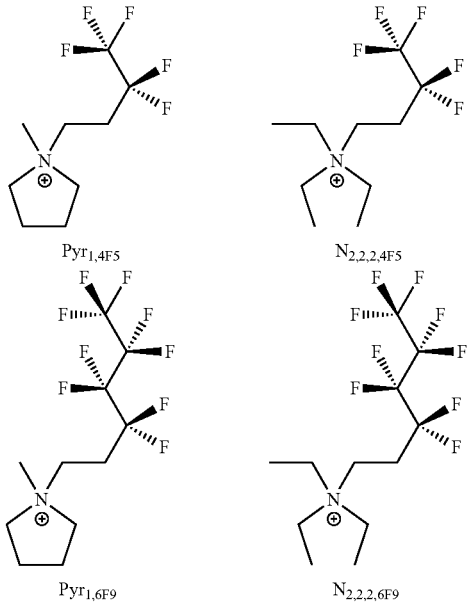

As an initial step in the synthesis of the ionic liquids, a fluoroalkyl bromide (4-bromo-1,1,1,2,2-pentafluorobutane) was synthesized. 0.8 g of 4.90 mmol, 1 equiv. 3,3,3,4,4-pentafluorobutane-1-ol was mixed with 5 mL dichloromethane in a 25 mL round bottom flask in a dry nitrogen atmosphere to form a solution. As the solution was stirred, 1.2 g of 4.40 mmol, 0.9 equiv. $PBr_3$ was dripped into the solution. After 1 hour, the solution was removed from the dry nitrogen atmosphere, exposed to ambient atmosphere, and slowly poured into a saturated sodium bicarbonate solution. Organic molecules were extracted using dichloromethane and washed with brine and deionized water before drying over $MgSO_4$ to form a slurry. The slurry was filtered and volatiles were removed to generate 4-bromo-1,1,1,2,2-pentafluorobutane.

Additionally, another fluoroalkyl bromide was also synthesized (6-bromo-1,1,1,2,2,3,3,4,4-nonafluorohexane). 1.11 g of 4.20 mmol, 1 equiv. 3,3,4,4,5,5,6,6,6-nonafluorohexane-1-ol was mixed with 5 mL dichloromethane in a 25 mL round bottom flask in a dry nitrogen atmosphere to form a solution. As the solution was stirred, 2.80 g of 9 mmol, 2.1 equiv. $PBr_3$ was dripped into the solution. After 1 hour, the solution was removed from the dry nitrogen atmosphere, exposed to ambient atmosphere, and slowly poured into a saturated sodium bicarbonate solution. Organic molecules were extracted using dichloromethane and washed with brine and deionized water before drying over $MgSO_4$ to form a slurry. The slurry was filtered and volatiles were removed to generate 6-bromo-1,1,1,2,2,3,3,4,4-nonafluorohexane. The synthesis of 4-bromo-1,1,1,2,2-pentafluorobutane and 6-bromo-1,1,1,2,2,3,3,4,4-nonafluorohexane proceeded according to the following reaction:

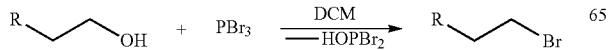

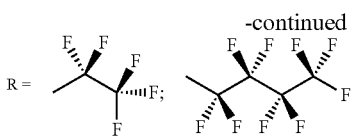

Example 1 ($Pyr_{1.6F9}$-TFSI)

Figure 2:
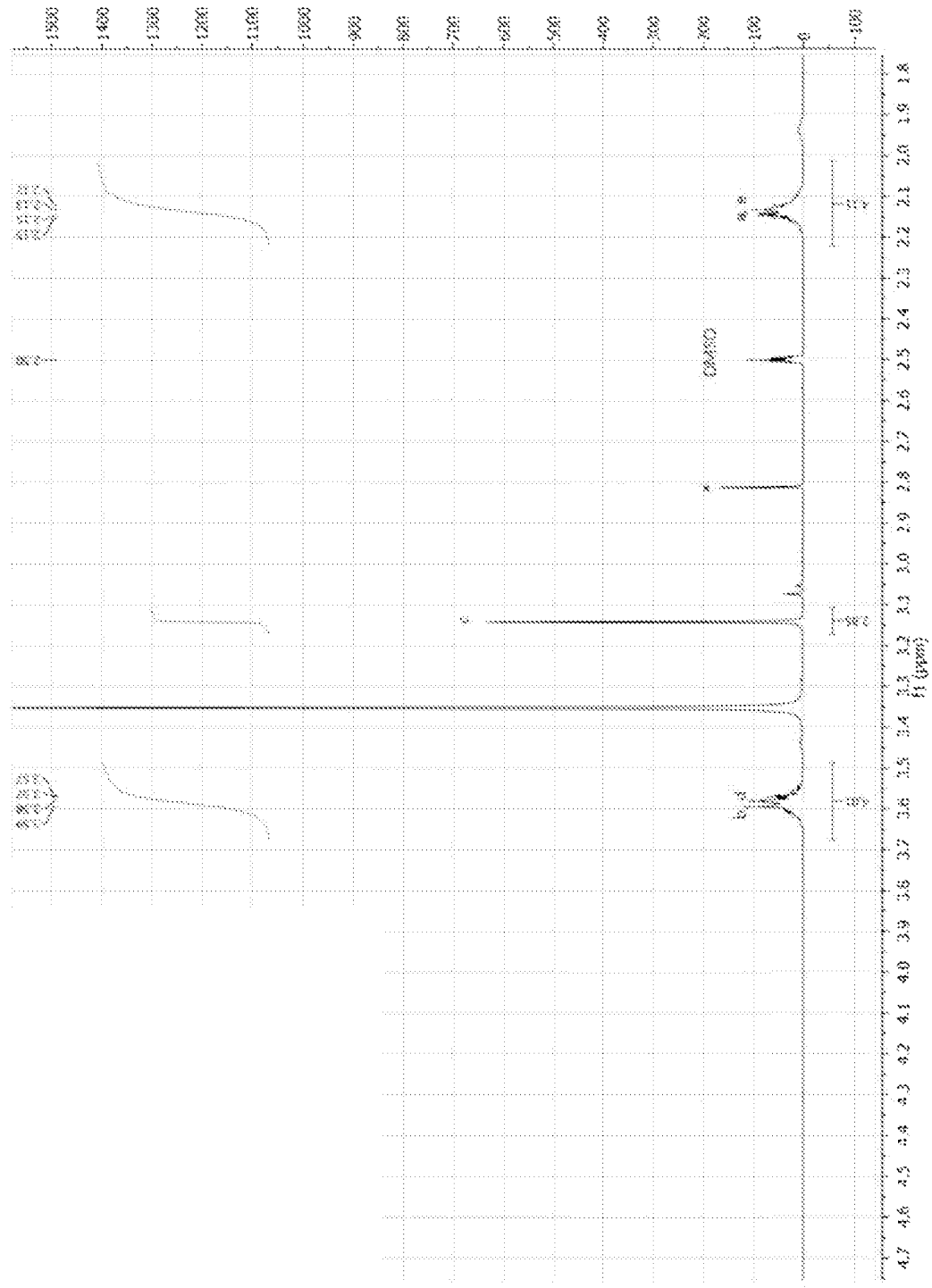
FIGS. 2-4 are nuclear magnetic resonance spectroscopy spectrographs demonstrating the presence of $Pyr_{1.6F9}$-TFSI ionic liquid using $^1H$, $^{13}C$, and $^{19}F$ nuclei, respectively.
Figure 3:
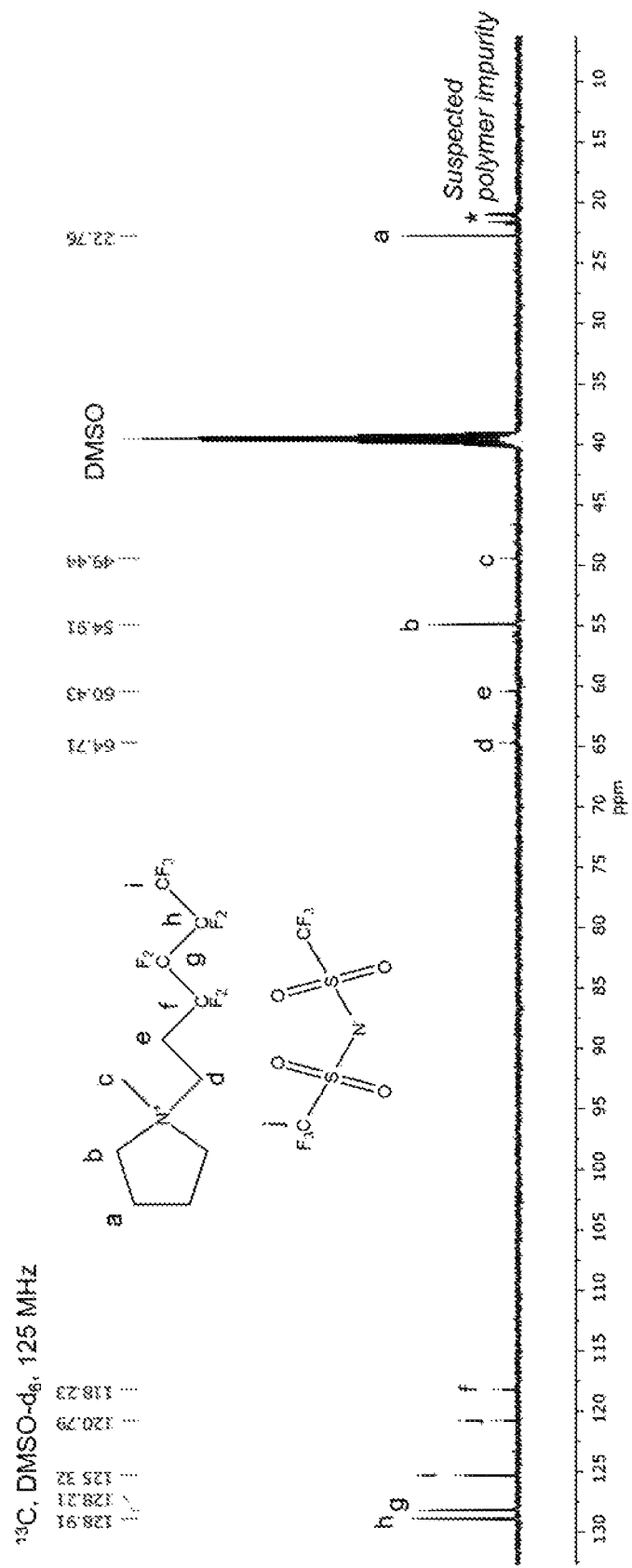
Figure 4:
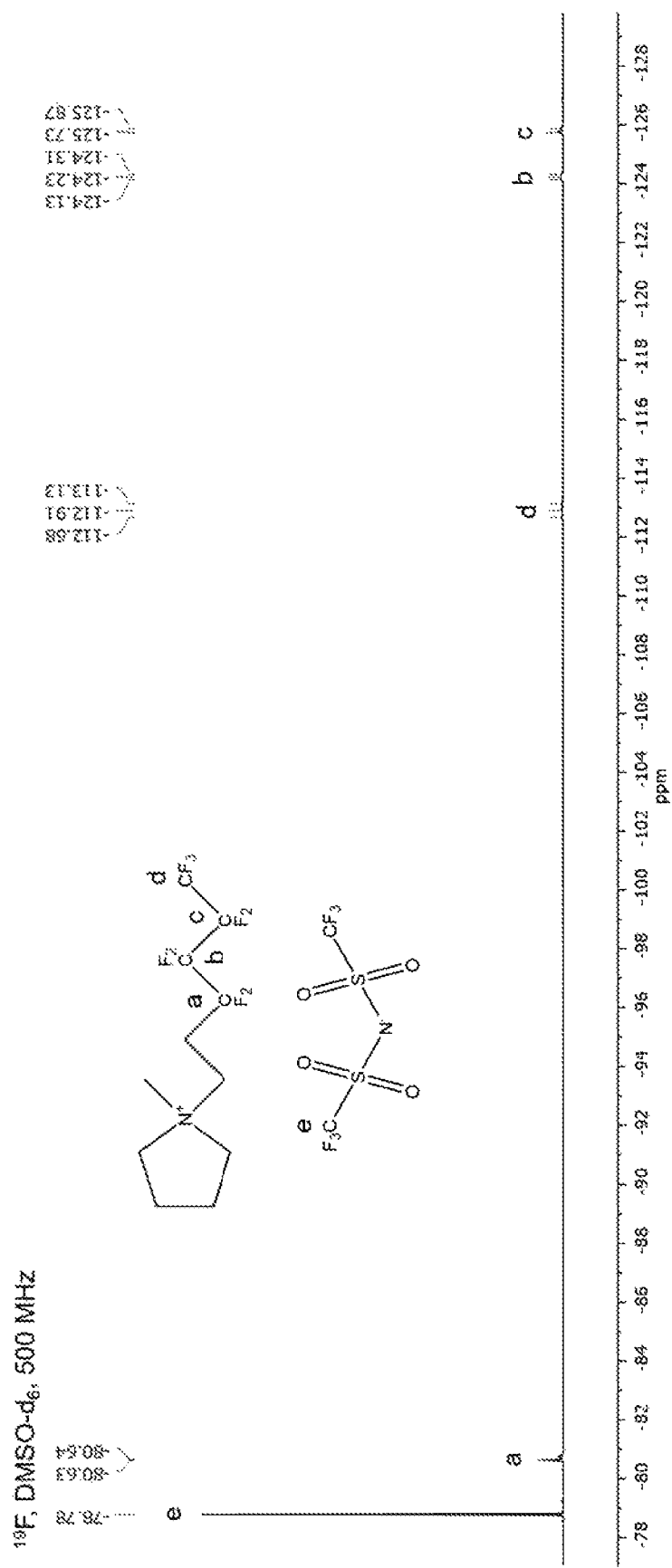

Prior to synthesizing $Pyr_{1.6F9}$-TFSI, an intermediate ionic liquid was first synthesized. The intermediate ionic liquid was synthesized by dripping the 6-bromo-1,1,1,2,2,3,3,4,4-nonafluorohexane (described above) into a precooled 0° C. flask containing 10 mL acetonitrile, 0.300 g of 4.21 mmol, 1.01 equiv. pyrrolidine, and 0.580 g of 4.2 mmol, 1 equiv. $K_2CO_3$. The resultant solution was stirred and warmed to room temperature for 8 hours. Solids were filtered off and the solution was treated with 0.77 g of 5.5 mmol, 1.3 equiv. methyl iodide. The solution was then heated to 50° C. for 12 hours to form an intermediate ionic solution. The intermediate ionic solution was then dried under vacuum to form an oil. The oil was then dissolved in water and treated with 2.8 g of 10 mmol, 2 equiv. LiTFSI resulting in the formation of a white oil after 2 hours. Excess liquid was removed and the oil was washed three times with 30 mL of deionized water to isolate $Pyr_{1.6F9}$-TFSI. The $Pyr_{1.6F9}$-TFSI was then placed in a nuclear magnetic resonance (NMR) device where 3 NMR spectrographs were taken using $^1H$, $^{13}C$, and $^{19}F$ nuclei. The spectrographs are shown in FIGS. 2-4. The chemical structure of $Pyr_{1.6F9}$-TFSI is depicted below:

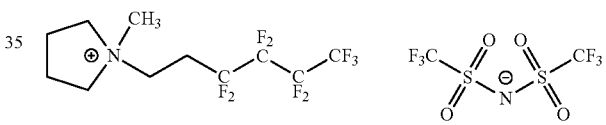

Example 2 ($N_{2.2.2.4F5}$-TFSI)

Figure 5:
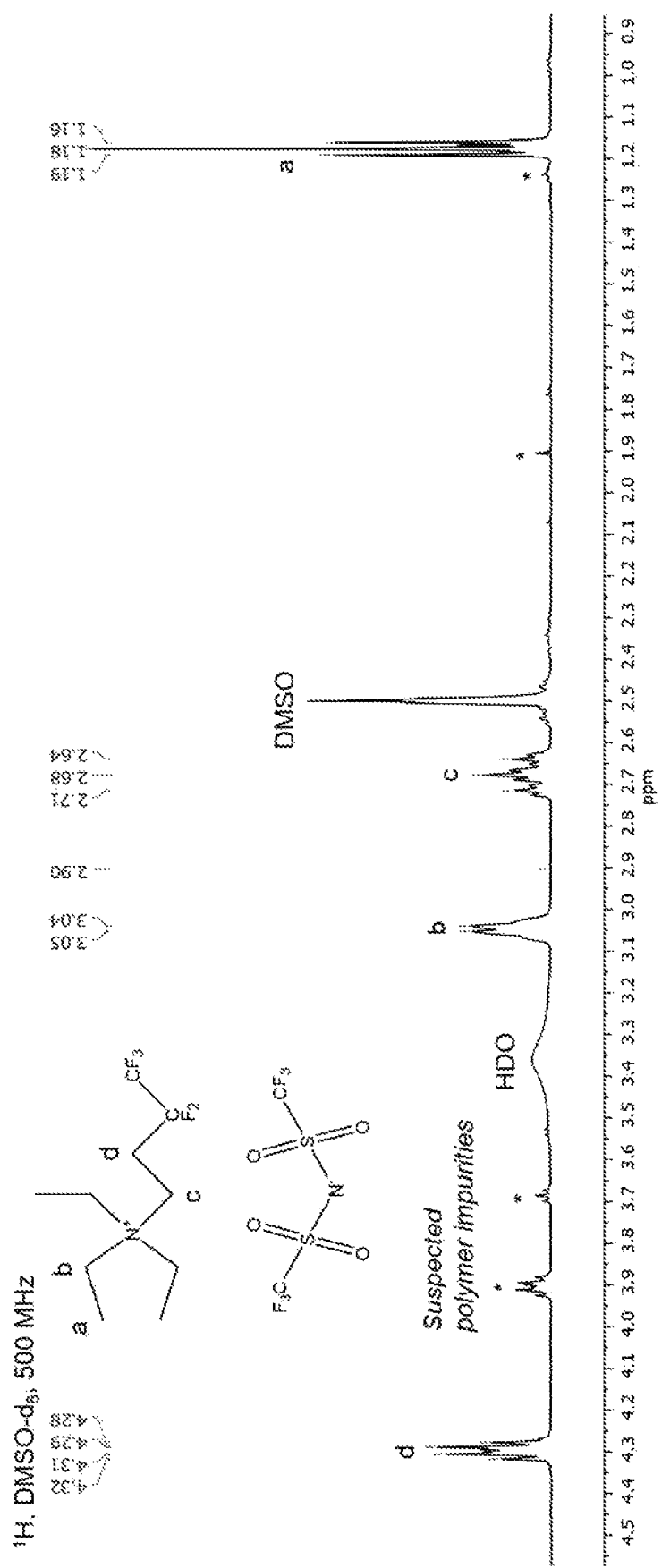
FIGS. 5-7 are nuclear magnetic resonance spectroscopy spectrographs demonstrating the presence of $N_{2.2.2.4F5}$-TFSI ionic liquid using $^1H$, $^{13}C$, and $^{19}F$ nuclei, respectively.
Figure 6:
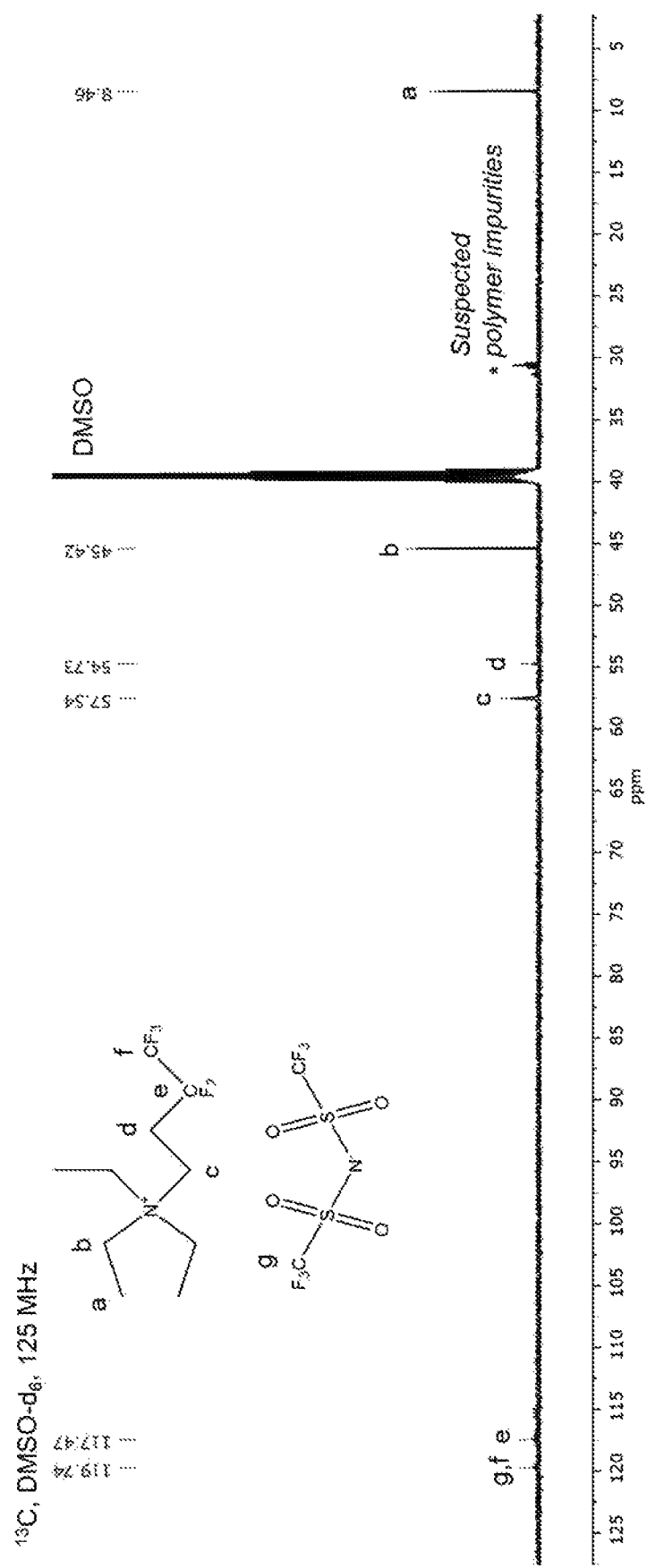
Figure 7:
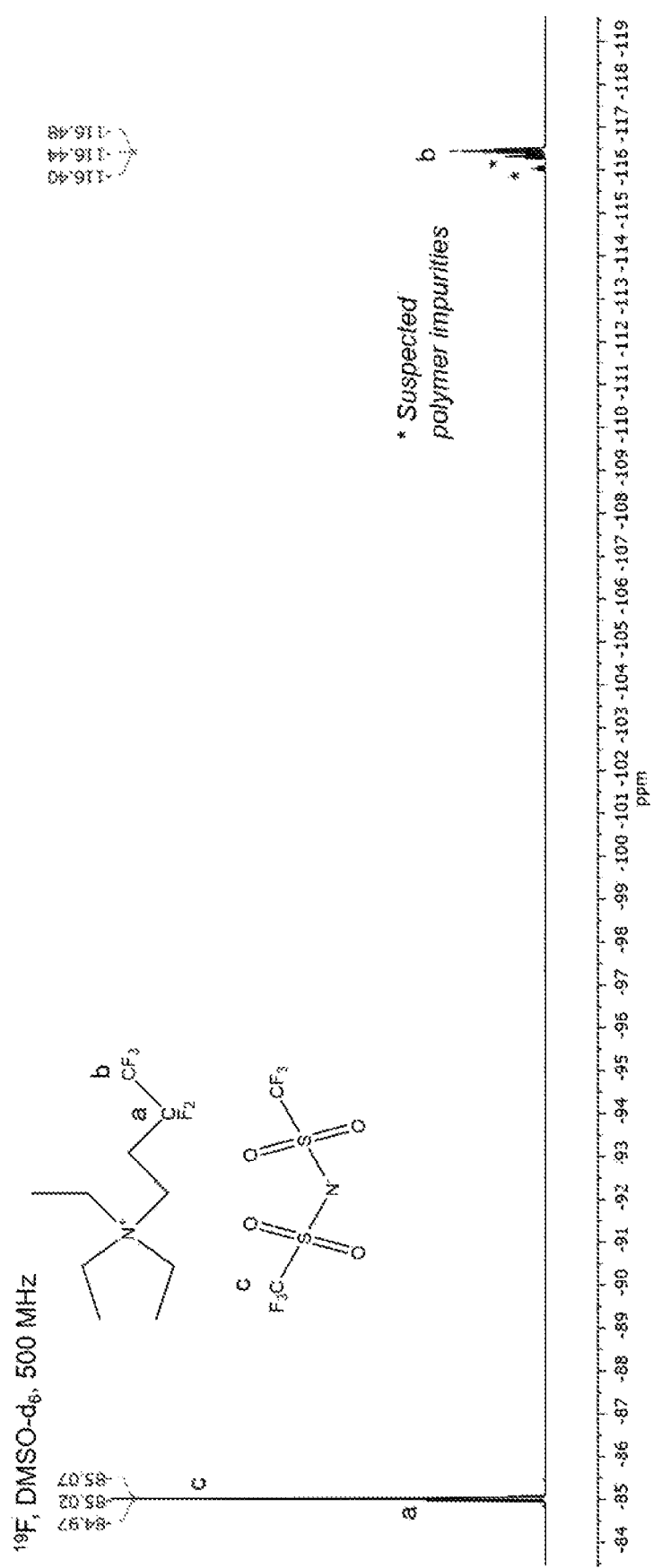

Prior to synthesizing $N_{2.2.2.4F5}$-TFSI, an intermediate ionic liquid was first synthesized. The intermediate ionic liquid was synthesized by dripping the 4-bromo-1,1,1,2,2-pentafluorobutane (described above) into a precooled 0° C. flask containing 10 mL acetonitrile and 0.500 g of 5 mmol, 1.01 equiv. triethylamine. The resultant solution was stirred and warmed to room temperature for 8 hours to form the intermediate ionic solution. Solids were filtered off and the intermediate ionic solution was treated with 2.8 g of 10 mmol, 2 equiv. LiTFSI resulting in the formation of a white oil after 2 hours. Excess liquid was removed and the oil was washed three times with 30 mL of deionized water to isolate $N_{2.2.2.4F5}$-TFSI. The $N_{2.2.2.4F5}$-TFSI ionic liquid was then placed in a nuclear magnetic resonance (NMR) device where 3 NMR spectrographs were taken using $^1H$, $^{13}C$, and $^{19}F$ nuclei. The spectrographs are shown in FIGS. 5-7. The chemical structure of $N_{2.2.2.4F5}$-TFSI is depicted below:

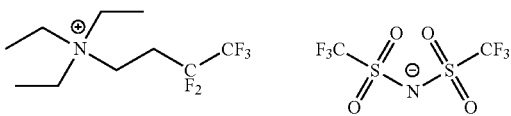 [SMILES: CC[N+](CC)(CC)CCC(F)(F)C(F)(F)F ; O=S(=O)([N-]S(=O)(=O)C(F)(F)F)C(F)(F)F]

Example 3 ($N_{2.2.26F9}$-Br)

Figure 8:
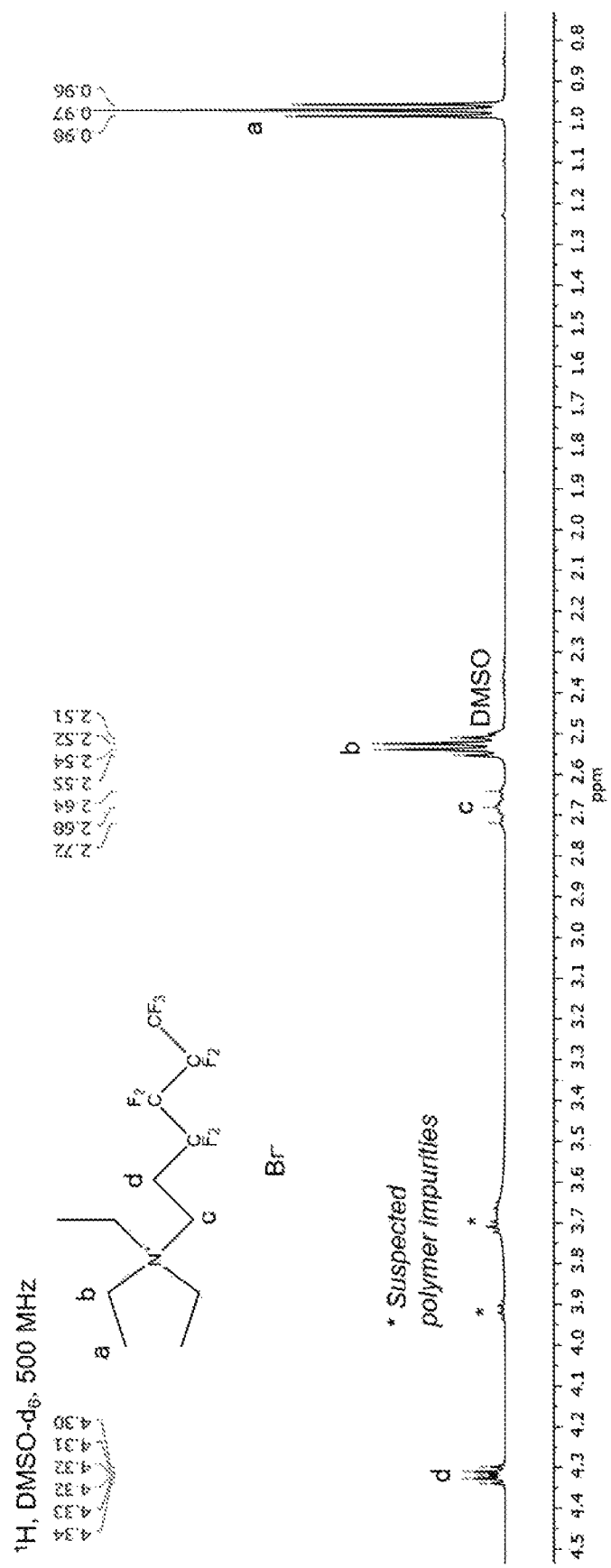
FIGS. 8-10 are nuclear magnetic resonance spectroscopy spectrographs demonstrating the presence of $N_{2.2.2.6F9}$-Br ionic liquid using $^1H$, $^{13}C$, and $^{19}F$ nuclei, respectively.
Figure 9:
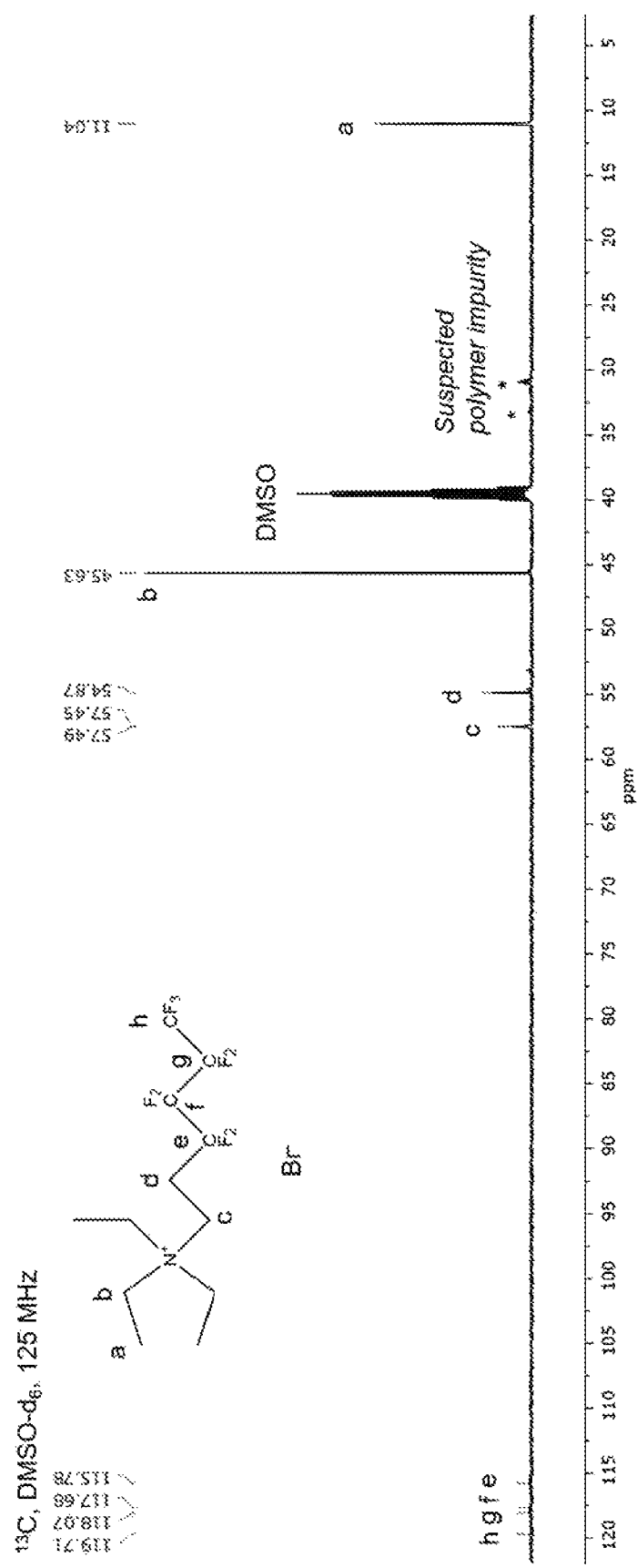
Figure 10:
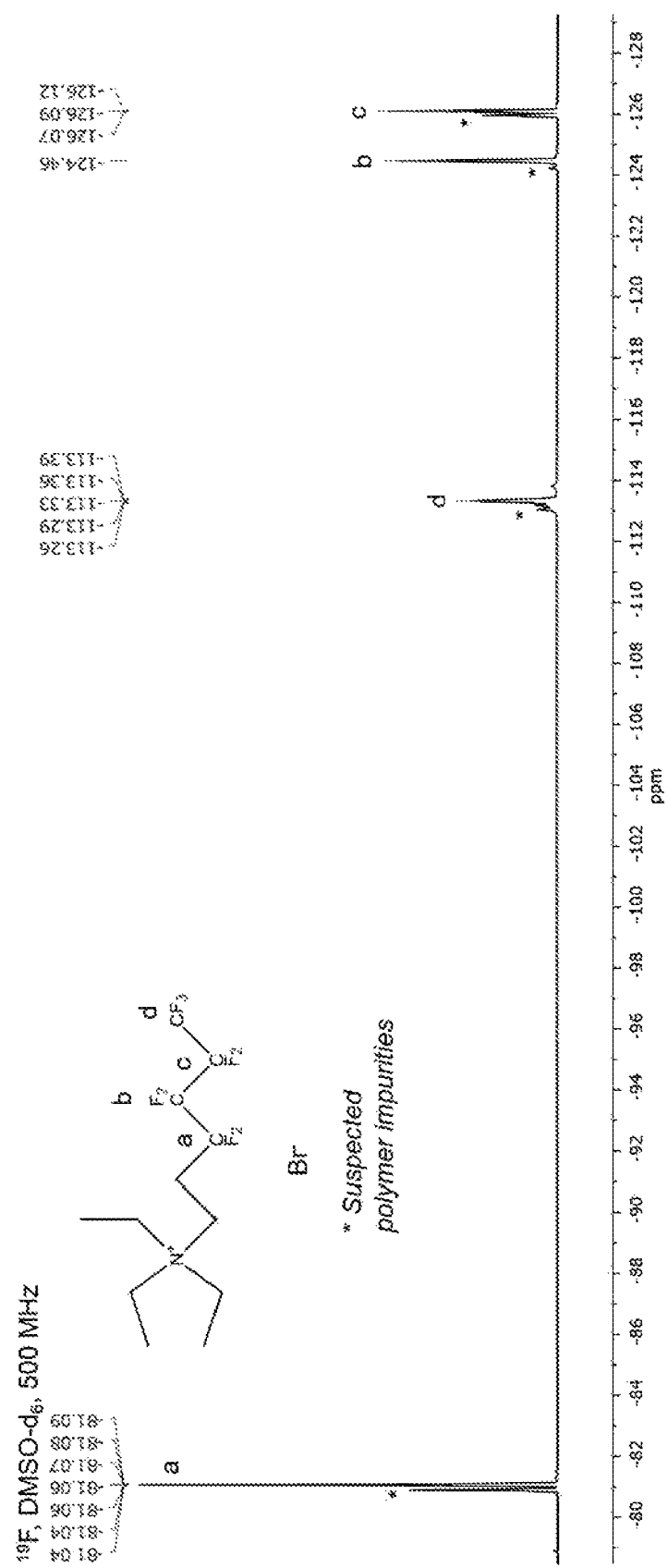

$N_{2.2.2.6F9}$-Br was formed by dripping 6-bromo-1,1,1,2,2,3,3,4,4-nonafluorohexane into a precooled 0° C. flask containing 10 mL acetonitrile and 0.500 g of 5 mmol, 1.2 equiv. triethylamine. The resultant solution was stirred and warmed to room temperature for 8 hours. Volatiles were removed under vacuum to isolate $N_{2.2.26F9}$-Br. The $N_{2.2.2.6F9}$-Br ionic liquid was then placed in a nuclear magnetic resonance (NMR) device where 3 NMR spectrographs were taken using $^1H$, $^{13}C$, and $^{19}F$ nuclei. The spectrographs are shown in FIGS. 8-10. The chemical structure of $N_{2.2.2.6F9}$-Br is depicted below:

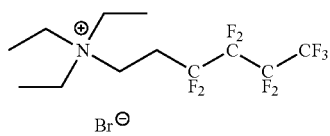 [SMILES: CC[N+](CC)(CC)CCC(F)(F)C(F)(F)C(F)(F)C(F)(F)F ; [Br-]]

Example 4 ($Pyr_{1.4F5}$-TFSI)

Figure 11:
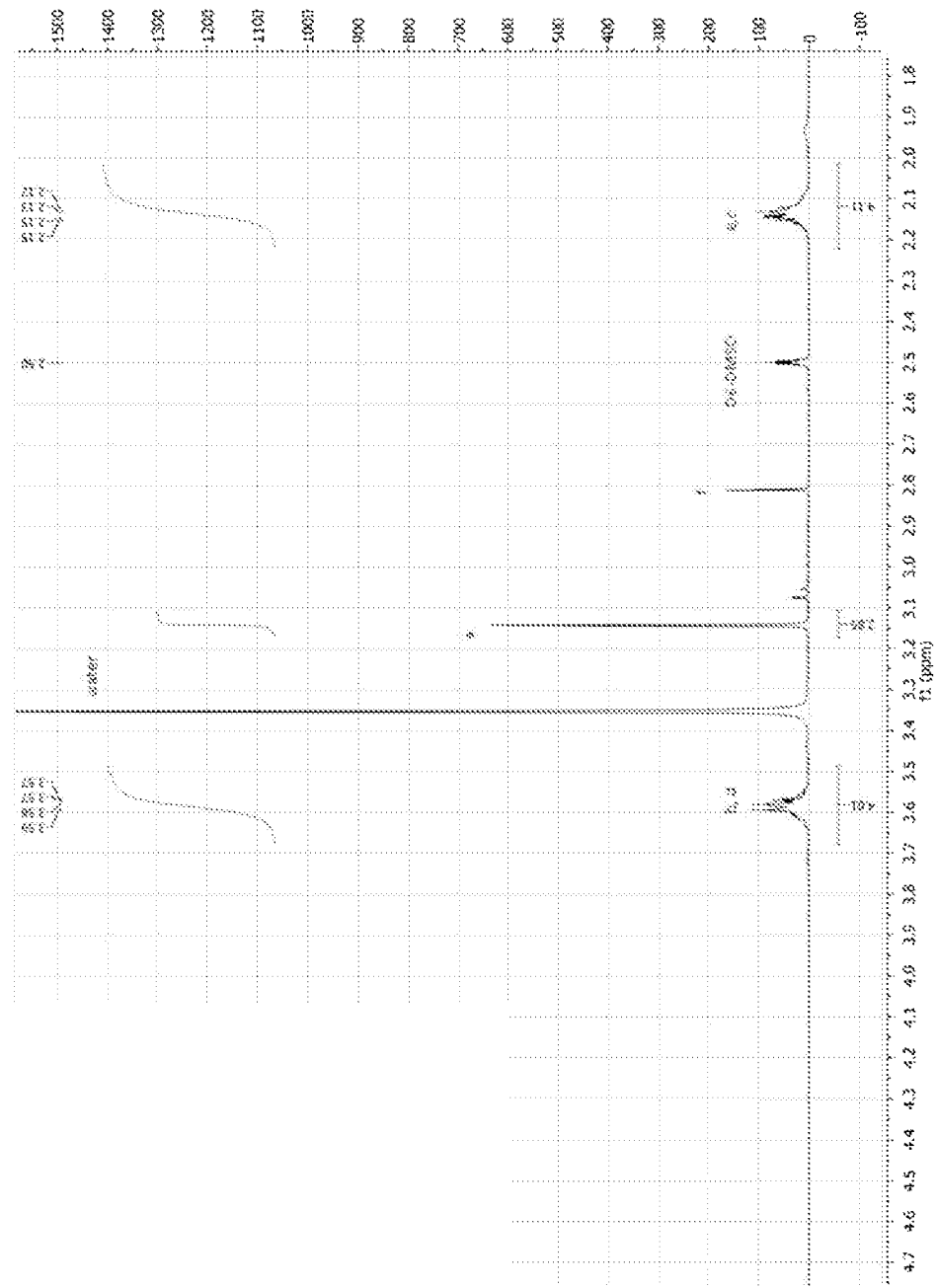
FIGS. 11-13 are nuclear magnetic resonance spectroscopy spectrographs demonstrating the presence of $Pyr_{1.4F5}$-TFSI ionic liquid using $^1H$, $^{13}C$, and $^{19}F$ nuclei, respectively.
Figure 12:
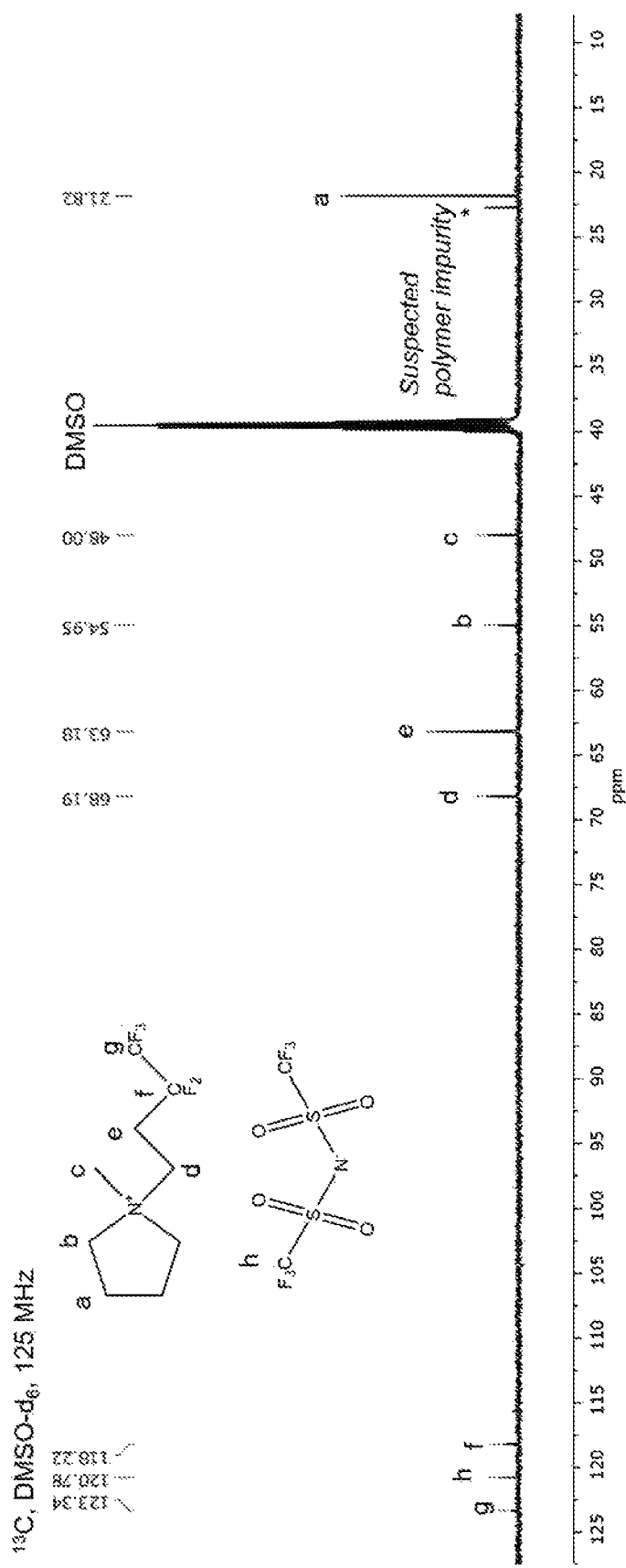
Figure 13:
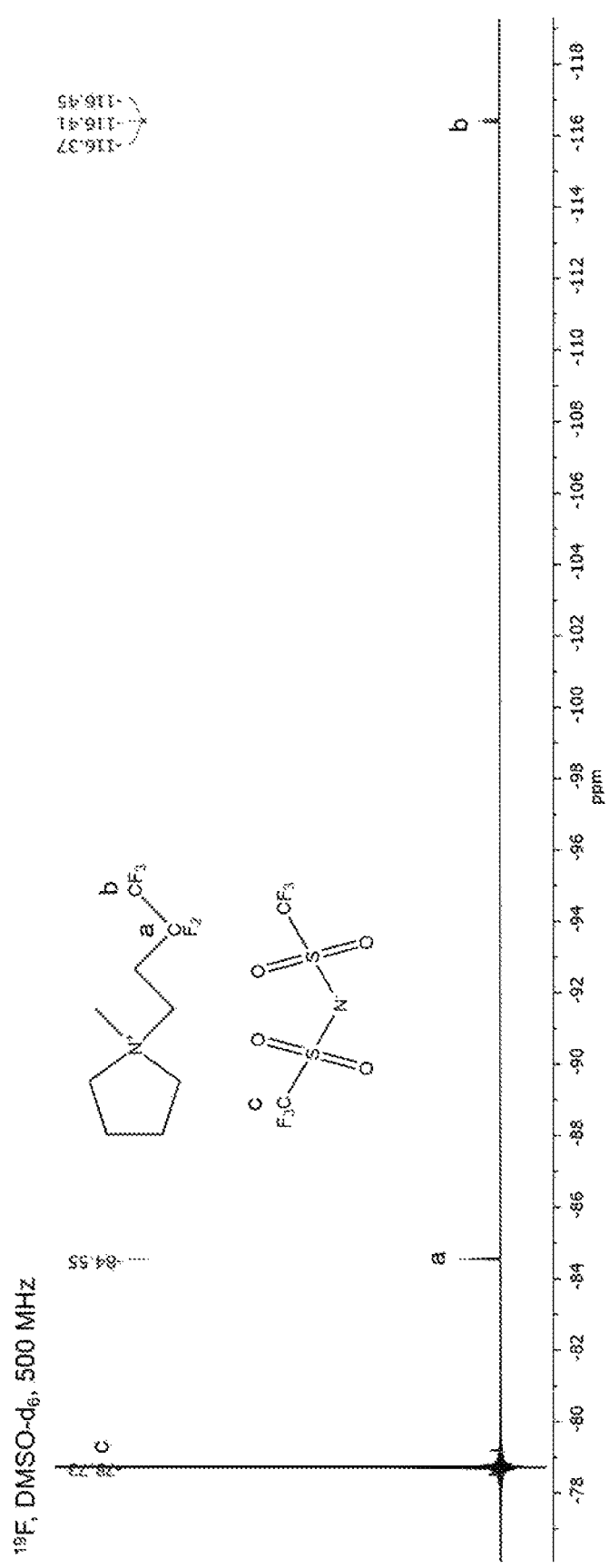

Prior to synthesizing $Pyr_{1.4F5}$-TFSI, an intermediate ionic liquid was first synthesized. The intermediate ionic liquid was synthesized by dripping the 6-bromo-1,1,1,2,2,3,3,4,4-nonafluorohexane (described above) into a precooled 0° C. flask containing 10 mL acetonitrile, 0.340 g of 4.9 mmol, 1 equiv. pyrrolidine, and 0.677 g of 4.9 mmol, 1 equiv. $K_2CO_3$. The resultant solution was stirred and warmed to room temperature for 8 hours. Solids were filtered off and the solution was treated with 0.9 g of 6.37 mmol, 1.3 equiv. methyl iodide. The solution was then heated to 50° C. for 12 hours to form an intermediate ionic solution. The intermediate ionic solution was then dried under vacuum to form an oil. The oil was then dissolved in water and treated with 2.8 g of 10 mmol, 2 equiv. LiTFSI resulting in the formation of a white oil after 2 hours. Excess liquid was removed and the oil was washed three times with 30 mL of deionized water to isolate $Pyr_{1.4F5}$-TFSI. The $Pyr_{1.4F5}$-TFSI was then placed in a nuclear magnetic resonance (NMR) device where 3 NMR spectrographs were taken using $^1H$, $^{13}C$, and $^{19}F$ nuclei. The spectrographs are shown in FIGS. 11-13. The chemical structure of the $Pyr_{1.4F5}$-TFSI is depicted below:

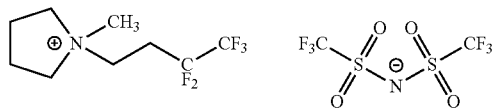

Not all embodiments disclosed herein must possess the characteristics discussed above. Furthermore, the claims are not to be limited by any such characteristics discussed herein unless recited in the claim itself.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent the term "includes" is used in either the detailed description or the claims, such term is intended to be inclusive in a manner similar to the term "comprising" as "comprising" is interpreted when employed as a transition word in a claim. The term "consisting essentially" as used herein means the specific materials or steps and those that do not materially affect the basic and novel characteristics of the material or method. All percentages and averages are by weight unless the context indicates otherwise. If not specified above, the properties mentioned herein may be determined by applicable ASTM standards, or if an ASTM standard does not exist for the property, the most commonly used standard known by those of skill in the art may be used. The articles "a," "an," and "the," should be interpreted to mean "one or more" unless the context indicates the contrary.

What is claimed is:

1. A metal-air battery comprising:
    a porous cathode current collector with an air interface;
    an electrolyte comprising an ionic liquid and optionally an organic solvent disposed in pores of the porous cathode current collector, the ionic liquid comprising:
        a cationic chemical species comprising:
            a nitrogen containing moiety and
            a partially fluorinated alkyl chain moiety; and
        an anionic chemical species,
    wherein a first carbon atom of the partially fluorinated alkyl chain moiety is non-fluorinated and bonded to a nitrogen atom of the nitrogen containing moiety,
    wherein a second carbon atom of the partially fluorinated alkyl chain moiety is non-fluorinated and bonded to the first carbon atom, wherein the partially fluorinated alkyl chain moiety contains a number of carbon atoms ranging from 3 to 26;
    wherein the ratio of carbon atoms to fluorine atoms in the partially fluorinated alkyl chain ranges from 1:1 to 0.53:1
    a metal anode; and
    a separator in contact with the electrolyte and bonded between the porous cathode current collector and the metal anode.

2. The metal-air battery of claim 1, wherein the nitrogen containing moiety is selected from the group comprising: trimethylamine, triethylamine, tributylamine, butyl diethyl amine, pyrazole, thiazole, isothiazole, imidazole, indoline, quinoline, isoquinoline, pyrrolidine, piperidine, azocane, piperazine, morpholine, thiomorpholine, pyridine, and derivatives thereof.

3. The metal-air battery of claim 1, wherein the partially fluorinated alkyl chain moiety contains a number of carbon atoms ranging from 5 to 26.

4. The metal-air battery of claim 1, wherein the partially fluorinated alkyl chain moiety contains a number of fluorine atoms ranging from 4 to 49.

5. The metal-air battery of claim 1, wherein the anionic chemical species is selected from the group comprising: tetrafluoroborate, tetrachloroaluminate, trifluoromethanesulfonate, bis(trifluoromethanesulfonyl)imide, bis(oxalate) borate, bis(perfluoroethylsulfonyl)imide, perchlorate, hexafluorophosphate, sulfate, phosphate, chloride, bromide, or iodide.

6. The metal-air battery of claim 1, wherein the nitrogen containing moiety is a pyrrolidine ring, where a nitrogen atom of the pyrrolidine ring is bonded to an alkyl chain or a functionalized alkyl chain, and the nitrogen atom of the pyrrolidine ring is further bonded to the partially fluorinated alkyl chain moiety.

7. The metal-air battery of claim 1, wherein the dynamic (shear) viscosity of the ionic liquid ranges from 10 to 200 cP.

\* \* \* \* \*